United States Patent [19]
Yagita

[11] Patent Number: 6,089,455
[45] Date of Patent: Jul. 18, 2000

[54] CODE RECOGNITION METHOD AND SYSTEM FOR ROTATING BODY

[75] Inventor: Kiyoshi Yagita, Minato-ku, Japan

[73] Assignee: Scan Technology Co., Ltd., Tokyo, Japan

[21] Appl. No.: 09/100,087

[22] Filed: Jun. 19, 1998

[30] Foreign Application Priority Data

Jun. 10, 1998 [JP] Japan .................................. 10-161686

[51] Int. Cl.[7] ...................................................... G06K 7/10
[52] U.S. Cl. ......................... 235/454; 235/91.1; 235/494; 235/469; 235/456; 235/464
[58] Field of Search ................................... 235/61.1, 464, 235/492, 494, 456, 454, 490, 469

[56] References Cited

U.S. PATENT DOCUMENTS

| | | | |
|---|---|---|---|
| 3,418,456 | 12/1968 | Hamisch et al. ........................ | 235/61.1 |
| 3,916,160 | 10/1975 | Russo et al. ............................. | 235/61.1 |
| 4,250,405 | 2/1981 | Ashcroft .................................... | 235/456 |
| 4,449,042 | 5/1984 | Hampson et al. ....................... | 235/464 |
| 5,860,679 | 1/1999 | Fukuda et al. ............................. | 283/70 |
| 5,926,556 | 7/1999 | Douglas et al. ......................... | 382/142 |

*Primary Examiner*—Thien M. Le
*Assistant Examiner*—Daniel S. Felten
*Attorney, Agent, or Firm*—Sughrue, Mion, Zinn, Macpeak & Seas, PLLC

[57] ABSTRACT

A code printing and recognition system for printing, reading, and decoding a code on an article while the article is rotated and conveyed along a predetermined path. The system includes a code printing unit for printing a code in a printing area of the article. The code printed on the article consists of a plurality of code signs, while the printing area is a portion of a circle having a predetermined radius and centered at the central point of the bottom surface portion or the top surface portion of the article. The printing area is divided into a plurality of concentric-circular portions, so that each code sign is encoded by placing a number of dots in a respective circular portion. The system also includes an image pickup unit for acquiring an image of the printing area of the article and a code recognition unit for detecting dots in each circular portion, counting the detected dots in each circular portion, and decoding each code sign on a basis of the dot count in a respective circular portion.

12 Claims, 7 Drawing Sheets

| Product code (Xn) | ASCII code (Hexadecimal) (Xn-A) | The second fig. of ASCII code (Decimal) ($16^1$ fig.) (Xn-A2) | The first fig. of ASCII code (Decimal) ($16^0$ fig.) (Xn-A1) |
|---|---|---|---|
| 0 | 30 | 3 | 0 |
| 1 | 31 | 3 | 1 |
| 2 | 32 | 3 | 2 |
| 3 | 33 | 3 | 3 |
| 4 | 34 | 3 | 4 |
| 5 | 35 | 3 | 5 |
| 6 | 36 | 3 | 6 |
| 7 | 37 | 3 | 7 |
| 8 | 38 | 3 | 8 |
| 9 | 39 | 3 | 9 |
| A | 41 | 4 | 1 |
| B | 42 | 4 | 2 |
| C | 43 | 4 | 3 |
| D | 44 | 4 | 4 |
| E | 45 | 4 | 5 |
| F | 46 | 4 | 6 |
| G | 47 | 4 | 7 |
| H | 48 | 4 | 8 |
| I | 49 | 4 | 9 |
| J | 4A | 4 | 10 |
| K | 4B | 4 | 11 |
| L | 4C | 4 | 12 |
| M | 4D | 4 | 13 |
| N | 4E | 4 | 14 |
| O | 4F | 4 | 15 |
| P | 50 | 5 | 0 |
| Q | 51 | 5 | 1 |
| R | 52 | 5 | 2 |
| S | 53 | 5 | 3 |
| T | 54 | 5 | 4 |
| U | 55 | 5 | 5 |
| V | 56 | 5 | 6 |
| W | 57 | 5 | 7 |
| X | 58 | 5 | 8 |
| Y | 59 | 5 | 9 |
| Z | 5A | 5 | 10 |

| | Number of dots | Data definition | |
|---|---|---|---|
| Area A | 5 dots (×2=10) | On left side:<br>The start of a 5-dot-printing mark which means I.J.P is working.<br>On right side:<br>The end of a 5-dot-printing mark which means I.J.P. is working | |
| Area B | 3~5 dots | The second fig. (36¹ fig.) of Product code | The second fig. (16¹ fig.) of ASCII code.<br>Max: 3 varieties |
| Area C | 0~15 dots | | The first fig. (16⁰ fig.) of ASCII code.<br>Max: 16 varieties |
| Area D | 3~5 dots | The first fig. (36⁰ fig.) of Product code | The second fig. (16¹ fig.) of ASCII code.<br>Max: 3 varieties |
| Area E | 0~15 dots | | The first fig. (16⁰ fig.) of ASCII code.<br>Max: 16 varieties |

CODE RECOGNITION METHOD AND SYSTEM FOR ROTATING BODY

BACKGROUND OF THE INVENTION

1. Field of the Invention

The present invention relates to a code recognition method and system for a rotating body which recognizes a code printed on the bottom surface portion or an upper surface portion of the rotating body and, more particularly, to a code recognition method and system for a rotating body which can correctly and rapidly recognize the code regardless of a printing direction of the code.

2. Description of the Related Art

In a product factory where foods or drinks are produced, product codes such as product names and product dates are printed on vessels or the like containing the products, and POP (Point Of Production) or the like is performed on the basis of the product codes. As code systems of the product codes, a barcode system and a kaluler code (two-dimensional data code) system are generally used. For example, when barcodes are used as means for creating product codes, an apparatus called a labeler for sticking an adhesive label is installed on a production line to stick a label at a predetermined position of a conveyed vessel. Known types of labelers include, a labeler for sticking a label which has been printed and a labeler for simultaneously performing sticking and printing of predetermined information. In a factory where mass production is performed such that products conveyed at a high speed need to be labeled, labelers of the former type are generally used.

However, there are supermarkets where the conventional codes described above cannot be used. For example, in physical distribution which treats can products such as cans of drink, since the conventional codes cannot be used for the following reason, when POP such as examination for defective products is to be performed to comply with the PL (Product Liability) laws or the like, the POP such as examination of defective products cannot be effectively performed by a conventional method.

Since a product which uses a vessel such as a bottle or a can having a cylindrical shape may be conveyed with rotation along a predetermined path, the printing direction of a code cannot be easily specified, and it is difficult to pattern-recognize the printed code at a high speed. In addition, when new pieces of information such as a company name, a factory name, and product data which are required for POP are to be added to a conventional system having a machine for code printing or label sticking, a conventional code area has a lack of capacity.

Furthermore, when codes having large amounts of information or codes having complex patterns are used in a system for products which are conveyed at a high speed on a production line, there is a probability that the codes cannot be printed in time. In order to form a new code area independently of a conventional code area stuck on the bottom of a can and print a code at a timing different from a timing at which the code area stuck, the code areas overlap due to rotation of a vessel, and there is a probability that the codes cannot be identified. Information serving as a house code need not be shown to a consumer, and there is information which should not be shown to a consumer. However, when such information needs to be desirably printed to perform product management, a conventional printer cannot be used effectively for this purpose.

SUMMARY OF THE INVENTION

The present invention has been made to overcome the above difficulties, and has as its object to provide a code recognition method and system for a rotating body which can rapidly and correctly recognize a code printed on the rotating body such as a can product or a bottle product conveyed at a high speed with rotation and can perform required examination, management, and the like on the basis of the code information.

The present invention relates to a code recognition system for a rotating body which recognizes a code printed on the bottom surface portion or the upper surface portion of the rotating body, and the object of the present invention is achieved by comprising: code printing means for, by using an area in a circle having a predetermined radius and centered on the central point of the bottom surface portion or the upper surface portion of the rotating body as a printing area, printing a code consisting of a plurality of signs specified by the number of dots in an almost radial direction in the circle; an image pickup means for picking up the printing area of said rotating body conveyed along a predetermined path; and code recognition means for detecting the dots included in divided areas obtained by dividing the printing area whose image is picked by said image pickup means into concentric-circular areas each having a width corresponding to a print interval of the signs, counting the dots, decoding the signs on the basis of the count values to recognize the code.

Furthermore, the object is more effectively achieved by the following:

the signs constituting the code are printed on a semicircle of the printing area, and said code recognition means sets the count values of the dots in the divided areas as a recognition code of the code;

said code recognition means compares output signals of analog images corresponding to the divided areas with a reference level to detect the dots and outputs the count values in the divided areas obtained while scanning the analog images as the recognition code of the code on real time;

said code printing means is designed such that a start mark and an end mark are added to both the ends of the outermost circular portion in the circle to print the code, and said code recognition means corrects addresses of the concentric-circular divided areas on the basis of detected addresses of the start mark and the end mark to perform a recognizing process for the code;

said code printing means is designed such that the code is printed by using an ink consisting of a component having a wavelength band out of a visible wavelength band, and said code recognition means compares the component having the wavelength band of a video signal output from said image pickup means with a reference level to detect the dots;

said code printing means is designed such that the code is converted into a code of a predetermined code system to print the code, and when the code of the predetermined code system is expressed by an n-ary number (n=an integer), the figures of the n-ary number are printed to correspond to the signs of the code in one-to-one correspondence;

said rotating body is a vessel which contains a product, the code includes a product code for specifying at least the product, and examination means for examining collation between the product code recognized by said code recognition means and the product code written at a predetermined position of the vessel is arranged;

on a production line designed such that a product code of a code system different from that of the code is, at least, written on the vessel conveyed through a temporary storage room after a product is contained in the vessel to ship the product, said printing means is installed on a convey path used from when the product is contained in the vessel to when the product reaches the temporary storage room, said image pickup means is arranged on a convey path used after the product code is printed, collation between the product code recognized by said code recognition means and the product code written at the predetermined position is examined by said examination means to examine matching properties between the product contained in the vessel and the product code written on the vessel;

a stop signal is output to stop the production line when the production code does not collate with the product in the examination performed by said examination means;

extraction means for extracting the vessel out of the system of the production line is arranged on the downstream side of the convey path on which the image pickup means is arranged, and said extraction means is instructed to extract the vessel as a defective product when the product code does not collate with the product in the examination performed by said examination means; and recording means for recording an examination result of the matching is arranged.

A code recognition method for a rotating body which recognizes a code printed on the bottom surface portion or the upper surface portion of a rotating body. The object of the present invention is achieved by a code recognition method in which a code consisting of a plurality of signs specified by the number of dots is used as an object to be recognized, an area in a circle having a predetermined radius and centered on the central point of the bottom surface portion or the upper surface portion of a rotating body is used as a printing area, and the code written in a semicircle of the printing area in an almost radial direction is recognized, wherein an image of the printing area is input to detect the dots included in concentric-circular divided areas each having a width corresponding to a print interval of the signs, and the signs are decoded by the count values of the detected dots in the divided areas to recognize the code.

DESCRIPTION OF THE PREFERRED EMBODIMENT

According to the present invention, a code printed on the bottom surface portion or the upper surface portion of a rotating body can be correctly and rapidly recognized regardless of the printing direction of the code. For example, the present invention can be preferably applied to the following production management system. That is, a code consisting of a plurality of signs printed on a cylindrical vessel such as a bottle or a can rotatably conveyed at a high speed on a production line is recognized in real time, and POP or the like is performed using the recognized code.

In a preferred embodiment of the present invention, an information which is encoded into a code consisting of a plurality of signs specified by the number of dots is printed in a circle having a predetermined radius and centered on the central point of the bottom surface portion or the upper surface portion of a rotating body. In recognition for the code, dots included in divided areas obtained by dividing a picked image of a printing area into concentric-circular areas each having a width corresponding to a print interval between the signs to count the dots. The signs are decoded on the basis of the count values to recognize the code. When the above code recognition scheme is employed, a code printed on a vessel conveyed along a path including a curve on a production line can be recognized at a high speed, and POP can be performed even at a supermarket where a conventional code cannot be used.

A start code and an end code are added to the outermost concentric-circular divided area as control codes. In code recognition, timing control in code reading is performed by using the control codes, the addresses of the concentric-circular divided areas are corrected, and a decoding process is performed while an analog image is scanned on the basis of the corrected addresses, so that the data code can be recognized at a high speed without a vessel edge detecting process or the like. In addition, an ink having a wavelength band different from that of the ink of the conventional code such that the code of the present invention can be recognized even if the vessel is rotated after a conventional code is printed to overlap the printing area of a code used in the present invention and the printing area of the conventional code. A code which need not be shown to a general consumer or a code which should not be shown is printed with an ink (e.g., UV (Ultraviolet) ink) consisting of a component having a wavelength band out of a visible wavelength band, so that the signal level of the component having the wavelength is compared with a reference level to recognize the code.

A preferred embodiment of the present invention will be described below with reference to the accompanying drawings. A code recognition system according to the present invention can be preferably applied to a production system in which lots of products, which are not only drinks but also medicine or unregulated drug products obtained by filling the gases of insecticide or deodorant powder spray in vessels, filled in cylindrical vessels each having a circular bottom portion are produced at a high speed. However, for descriptive convenience, the present invention will be described below by using a case wherein the present invention is applied to a can product obtained by filling drink in a can and a case wherein encoding and decoding are performed by using a product code for specifying the type of a can product as a new code. The present invention will be described below with reference to a case wherein a printing area for a conventional code (to be referred to as a "conventional code" hereinafter) such as a best end has been formed on the bottom surface portion of a can.

Figure 1:
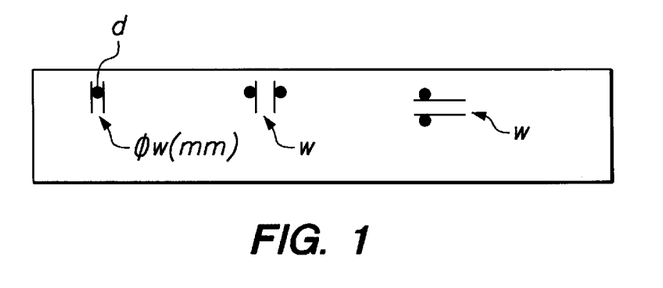
FIG. 1 is the first view for explaining a code form used in the present invention.
Figure 2:
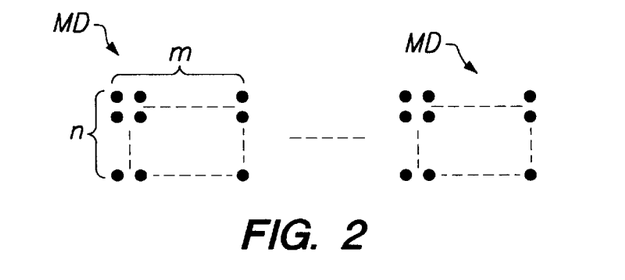
FIG. 2 is the second view for explaining a code form used in the present invention.

First, a code (to be referred to a "new code" hereinafter to discriminate this code from the above conventional code) used in the present invention will be described below by using a concrete example. In the present invention, signs are encoded depending on the numbers of dots of the signs to form a new code. FIGS. 1 and 2 show concrete examples of new codes. Each sign is expressed by the number of dots d (circular points each having a diameter of w (mm)) having the same shape. The interval of adjacent dots d in a dot group constituting one sign is equal to the diameter of the dot d in this embodiment. The new code consists of a plurality of signs specified by the number of dots. As shown in FIG. 2, each sign MD constituting a new code is represented by, e.g., an arrangement having an n (row)×m (column) matrix.

When a sign is expressed by the number of dots, if the sign is not visually checked by a person, encoding may be performed such that the figures of a conventional code correspond to the figures of a new code in one-to-one correspondence without any problem. However, in the present invention, in order to cause a person to relatively easily check each sign by the number of dots of the printed new code, a conventional product code which is encoded by a predetermined code system is converted into a code of a standard code system, and encoding is performed such that the figures of the converted code correspond to the figures of the new code.

As a standard code, for example, the ASCII code (American Standard Code for Information Interchange) or the ISO code (International Organization for Standardization Code) is preferably used. In the present invention, when a code of such a standard code system is represented by an n-ary (n is an integer which is 2 or more), the figures of the n-ary number correspond to the signs of the new code in one-to-one correspondence, so that the signs of the figures are represented by the number of dots. For descriptive convenience, a product code will be exemplified, and a case wherein the ASCII code is used as a standard code will be described below.

Figure 3:
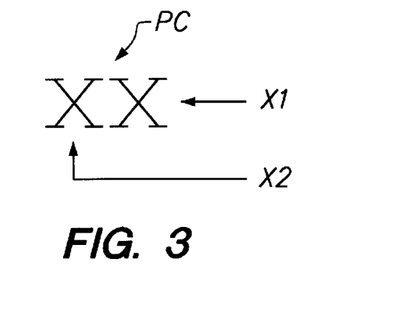
FIG. 3 is a view showing a concrete example of a conventional product code.
Figure 4:
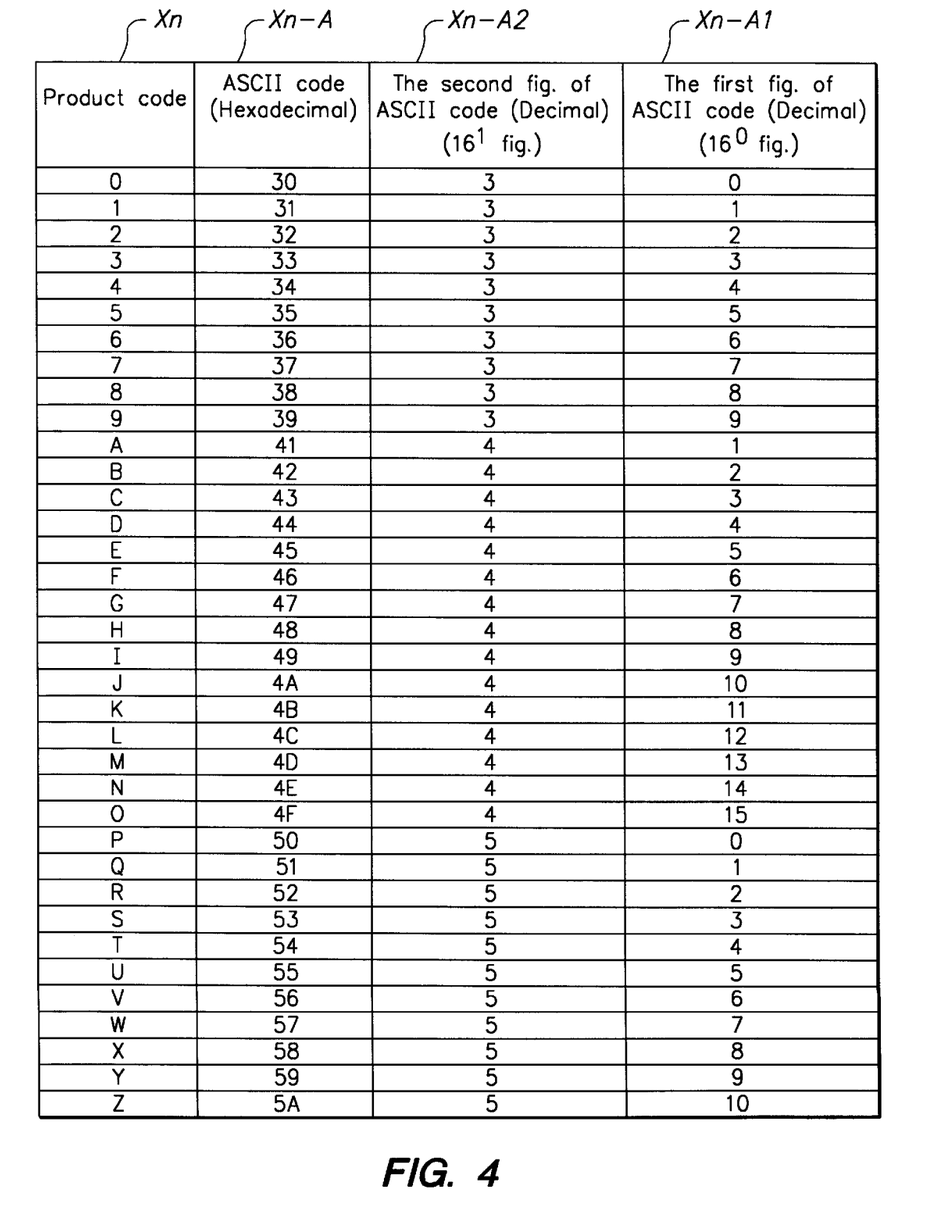
FIG. 4 is a view showing the correspondence between conventional product codes and the ASCII code (Hexadecimal) and between the conventional product codes and signs constituting codes used in the present invention.

FIG. 3 shows a concrete example of a conventional product code. In a product code PC, 36 types of alphanumeric characters constituted by 10 types of numbers, i.e., "0" to "9" and 26 types of alphabets, i.e., "A" to "Z", as shown in Xn in FIG. 4, are used as a code of one character, and the types of products are expressed by 2-figure alphanumeric signs X1 and X2 (X1=first figure of product code; $36^0$ figure, and X2=the first figure of product code; $36^1$ figure). In such a code system, a maximum of 36×36=1,296 types of products can be expressed.

In the above product code, when a symbol Xn consisting of alphanumeric characters "0" to "Z" of a product code is represented by the ASCII code (Hexadecimal), as shown in Xn-A in FIG. 4, the sign Xn is represented by "30" to "5A". When the figures ($16^N$ figure) are represented in decimal, as shown in Xn-A1 and Xn-A2 in FIG. 4, the first figure is represented by "3" to "5", and the second figure is represented by "0" to "10". In this embodiment, the figures Xn-A1 and Xn-A2 of a hexadecimal number when the ASCII code is represented by a hexadecimal number correspond to the signs of a new code in one-to-one correspondence, and the numeral values of the figures are expressed by the numbers of dots. In this manner, when the figures Xn-A1 and Xn-A2 of the ASCII code are expressed by the numbers of dots, the first figure ($16^0$ figure) is expressed by 0 to 15 dots, and the second figure ($16^1$ figure) can be expressed by 3 to 5 dots. When one column is represented by 5 dots, the first figure Xn-A1 of the ASCII code can be represented by a 3-column dot matrix, and the second figure Xn-A2 can be represented by a 1-column dot matrix.

Figure 5:
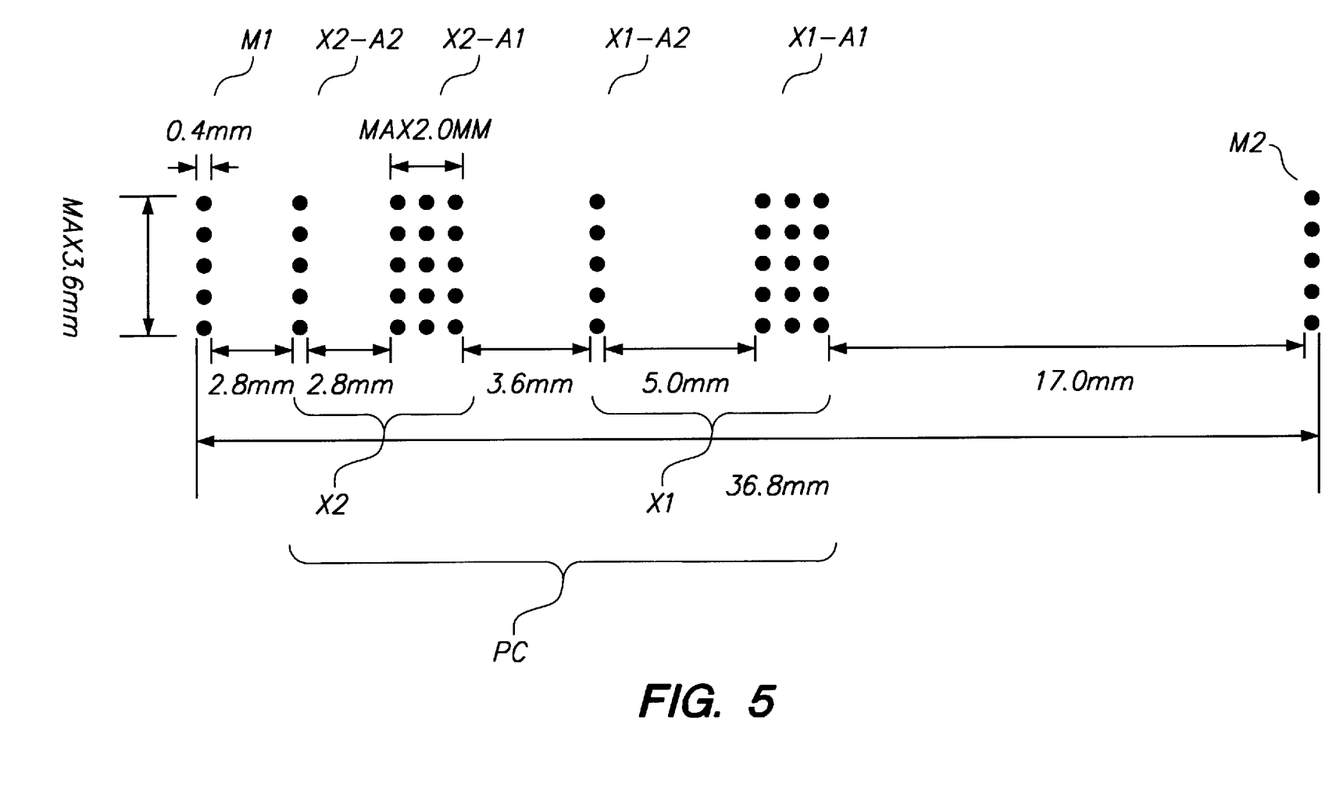
FIG. 5 is a view showing a concrete example of a code form used in the present invention.

FIG. 5 shows a code form of a new code and the following example. That is, a start mark M1 and an end mark M2 (in this embodiment, each mark is constituted by 5 dots are arranged in one line) are added to the start and the end of each of the signs X2-A2, X2-A1, X1-A2, and X1-A1 constituting a code (to be referred to as a "data code" hereinafter) constituted by the above dot matrix, the first sign X2-A2 of the data code is arranged next to the start mark M1, and the last sign X1-A1 is arranged near the central point between the start mark M1 and the end mark M2. The diameter of a dot, an interval between the start mark M1 and the end mark M2, and intervals between the signs X2-A2, X2-A1, X1-A2, and X1-A1 constituting the data code PC have sizes obtained when the signs are arranged in concentric-circular divided areas (to be described later). In this embodiment, sizes shown in FIG. 5 are set.

Figure 6:
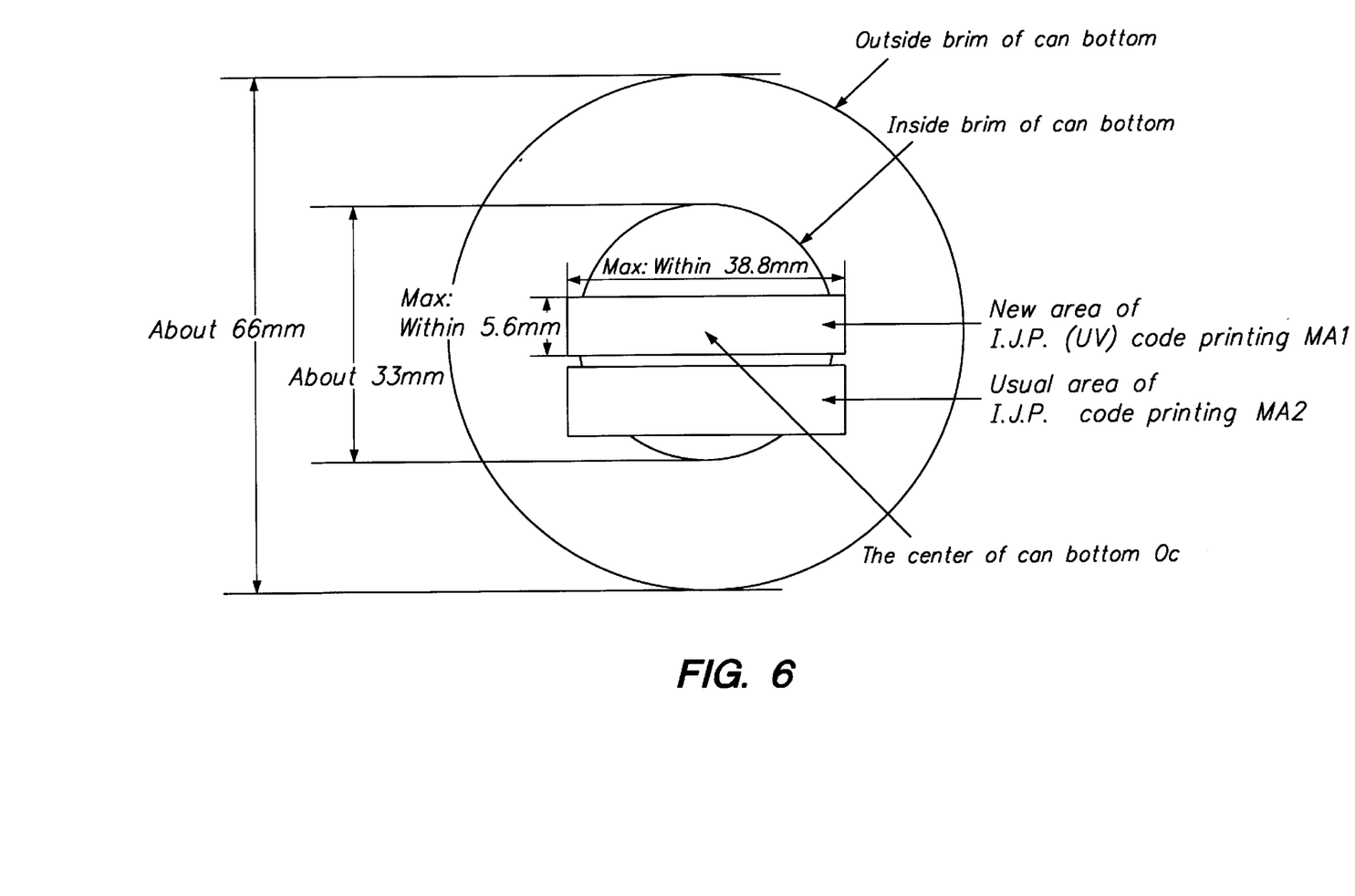
FIG. 6 is a plan view showing a concrete example of printing areas arranged on the bottom surface portion or the upper surface portion of a rotating body.

A printing position of a new code will be described below. FIG. 6 shows a concrete example of a printing area formed on the bottom portion of a can. An area MA1 formed on the bottom portion of the can in the almost radial direction of the can indicates a printing area in which a new code including the start mark and the end mark is printed, and the adjacent area MA2 indicates a printing area in which a conventional code is printed. In this embodiment, a rectangular printing area having a size of MAX: 38.8 mm×MAX: 5.6 mm is formed on the can bottom having a diameter of about 66 mm. The size of the printing area is set by the number of figures of a data code, the size of a dot, the dot matrix size of each sign, a print interval, and the like.

In the present invention, a rotating body is used as an object, and it is supposed that the print timings of a conventional code and a new code which are printed on the rotating body conveyed along a predetermined path are different from each other (for example, the conventional code is printed by a conventional ink-jet printer, and the new code is printed by an ink-jet printer which is newly arranged). It is also supposed that the printing area MA1 of the new code cannot be independently formed depending on the size and position of the printing area of the conventional code. The codes are printed with inks having different wavelength bands such that overlapping printed codes can be recognized. A code which need not be shown to a general consumer or a code which should not be shown to the general consumer is printed with an ink consisting of a component having a wavelength band out of a visible wavelength band, and the component having the wavelength band is separated from the other component to recognize the code.

Figure 7:
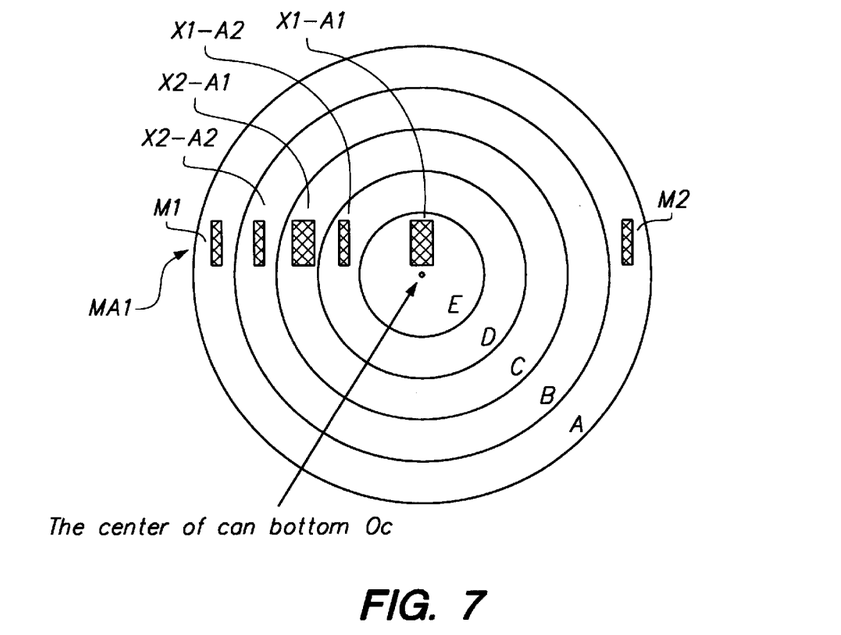
FIG. 7 is a plan view showing an example of the arrangement of signs printed in printing areas.

FIG. 7 shows an example of the arrangement of signs printed in printing areas. Signs printed in the printing area MA1 are printed in a plurality of areas obtained by dividing the printing area by a plurality of concentric-circular circles centered on a central point Oc of the can. The start mark M1 and the end mark M2 are printed on both the end sides of the outermost circular portion in the circle, i.e., in an outermost concentric-circular divided area A. When the figures of a 2-figure product code PC (X2,X1) consisting of the above alphanumeric characters are represented by hexadecimal numbers as the ASCII code, as shown in FIG. 7, the area is divided into four concentric-circular areas B, C, D, and E, and the signs constituting the data code may be allocated to the divided areas, respectively. The width of each divided area may be set to assure, as the area of the data code, areas in which dot groups of 5(row) (5 dots)×1 column, 5(row)× 3(column), 5(row)×1(column), and 5(row)×3(column) can be recorded if the signs are sequentially allocated from the upper figure to the lower figure (X2-A2, X2-A1, X1-A2, and X1-A1).

In a print control means for printing a new code, when a can conveyed along a predetermined path is used as an object, print commands of the signs are transmitted to a printer at predetermined intervals on the basis of the information of a convey speed of a can and the definition information of the new code. As shown in FIG. 7, the print control means performs control such that the start mark M1, data codes X2-A2 to X1-A1, and the end mark M2 are printed in five divided areas A, B, C, D, and E in the almost radial direction, respectively.

Figure 8:
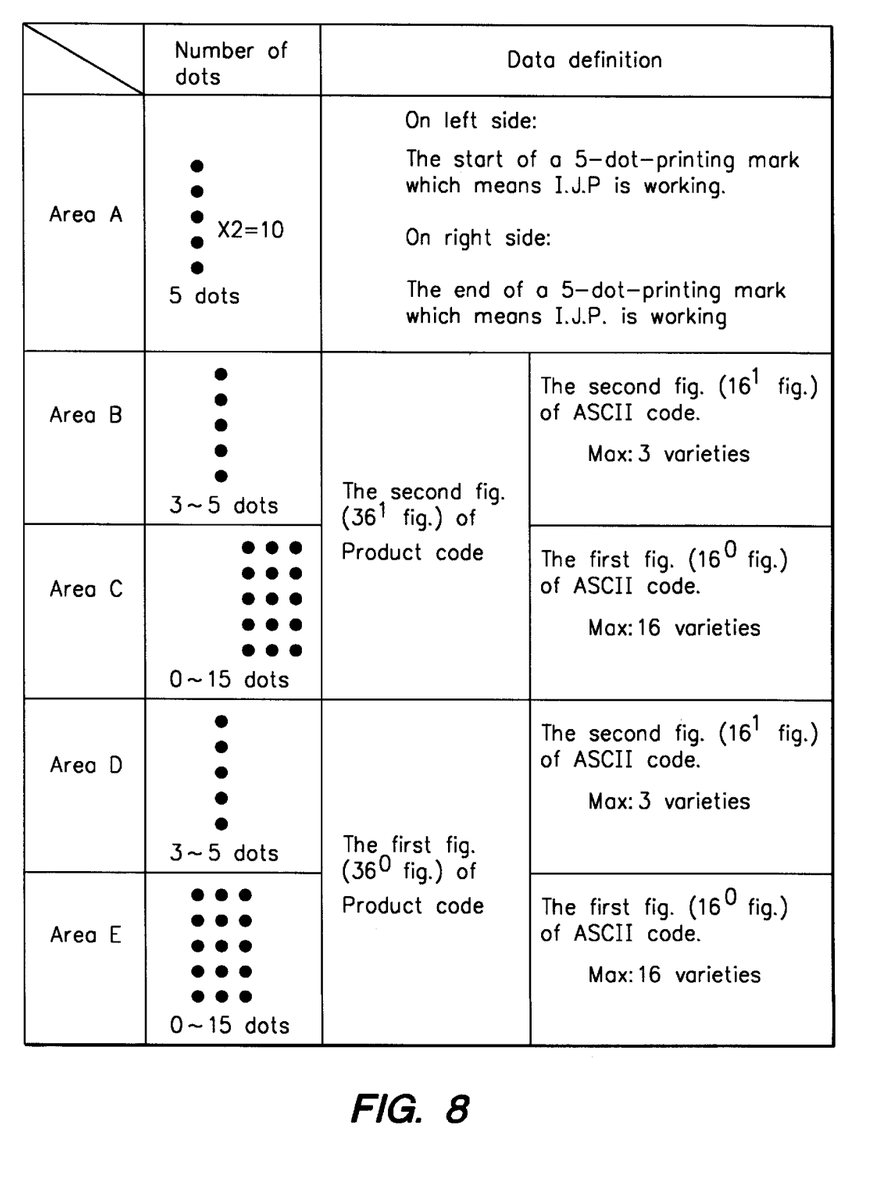
FIG. 8 is a view showing data definition of a new code and the relationship between divided areas A to E in which the signs are printed and the numbers of dots of the signs.

A code recognition method according to the present invention will be described below by using the above form of a new code as an example. FIG. 8 shows the data definition of a new code and the relationship between divided areas A to E in which the signs are printed and the numbers of dots of the signs. In a code recognition means for recognizing a new code, on the basis of the definition information of the new code and the information of an image address (sensor output channel address or the like) corresponding to the concentric-circular divided areas A to E, the new code is recognized. In this embodiment, an image processor is used as the code recognition means. In this image processor, the image of a printing area picked by an image pickup means is input, and the output signal of an analog image is compared with a reference level (signal level of a component having the corresponding wavelength) to detect dots included in the concentric-circular divided areas each having a width corresponding to a print interval between the signs, and the signs are decoded by the count values of detected dots in the divided areas to recognize the new code. In this embodiment, the count values (arrangement data of the count values) of detected dots in the divided areas B to E serve as decoded data of the new code.

A case wherein the present invention is applied to a production system of can products will be described below as an example.

Figure 9:
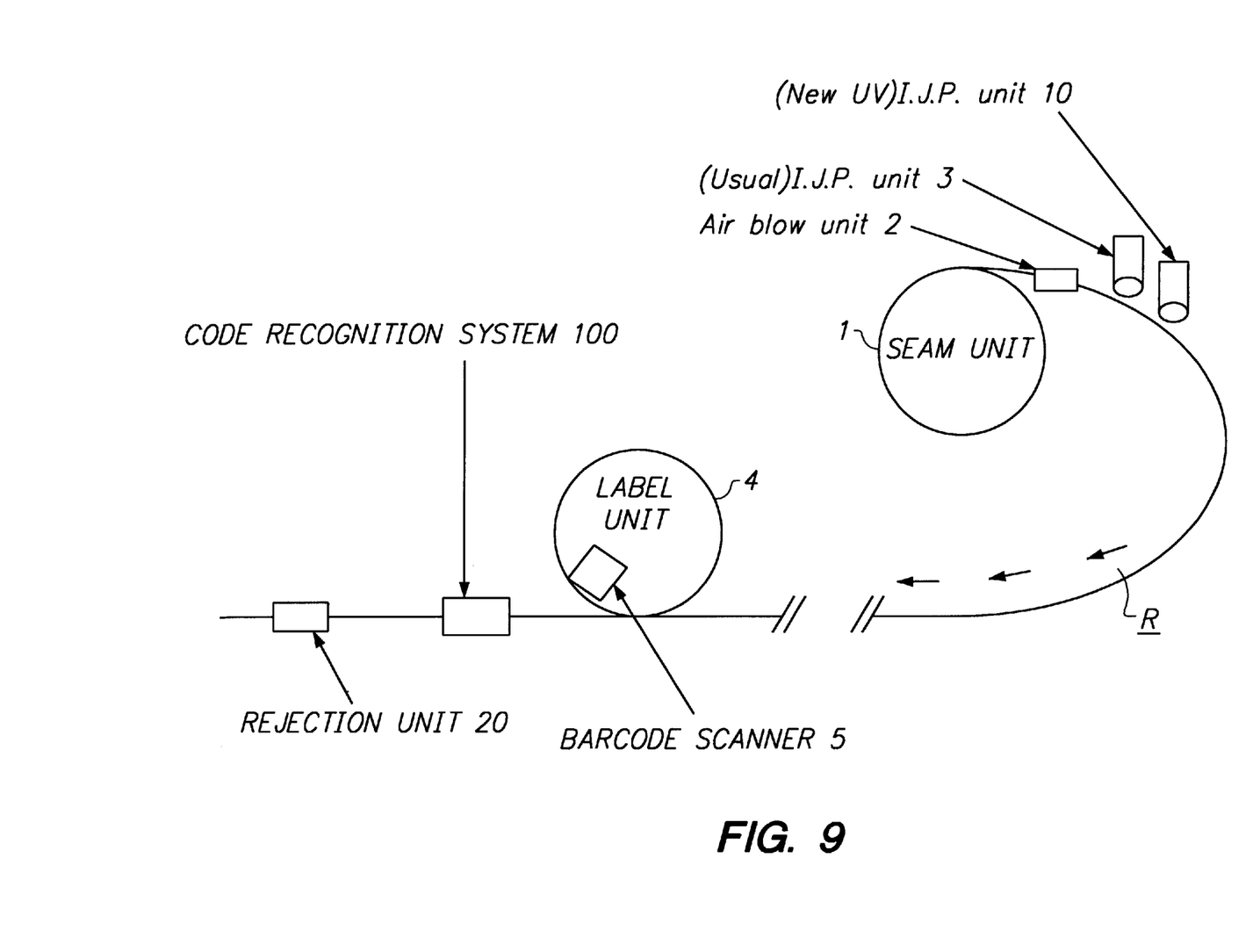
FIG. 9 is a view illustrating the arrangement of the main portion of a production system to which a code recognition system according to the present invention is applied.

FIG. 9 illustrates the arrangement of a main portion of a production system to which a code recognition system according to the present invention is applied. A flow of products on the production line and the installation arrangement of units according to the present invention will be described below with reference to FIG. 9. Referring to FIG. 9, an arrow R indicates a convey path for products, and cans filled with products by a filler (not shown) are conveyed to a portion of a seam unit 1. The seam unit 1 is a machine for closing a lid of a can to seal drink in the can. An air blow unit 2 for blowing air to remove water drops or the like adhered to the bottom portion of the can, an ink-jet printer 3 for printing a conventional code (best end or the like) in a conventional code printing area, and an ink-jet printer 10 for printing a new code such as a product code according to the present invention are arranged on the convey path arranged on the downstream side of the seam unit 1.

The cans on which the conventional codes and the new codes are printed is temporarily stored in a temporary storage room (position where about 10,000 cans are temporarily stored) (not shown), and then conveyed to the portion of a label unit 4. The label unit 4 is a device for sticking a label on which a product code or the like is printed on a predetermined portion of the can. This embodiment employs the following arrangement. That is, a barcode scanner 5 for reading the product code of the label is arranged near the label unit 4, and the signal of the read product code of the label is output to an examination device of a code recognition system 100.

A can on which a label is stuck by the label unit 4 is conveyed to an examination unit in which an image pickup device of the code recognition system 100 is installed. When cans pass through the examination unit, the cans are brought to the center of the convey path by a regulating guide for centering cans and continuously conveyed one by one. In the code recognition system 100, the image of a new code printed on the can bottom is picked by the image pickup device, and the product code included in the new code collides with the product code of the label read by the barcode scanner 5 to check whether the product code coincides with the product code of the label, thereby examining whether the product filled in the can matches the label. This examination is performed to avoid the following disadvantage. That is, different types of products are mixed by an erroneous operation of a machine or the like for extracting the products from the temporary storage room, and a product in which the content of the can does not match its label is shipped.

If it is determined in the examination of the code recognition system 100 that the product code does not match the product, the can is determined as a defective product, and an interlock signal is output to stop the production line, or the can determined as a defective product is extracted from the system. In this embodiment, a rejecter (extracting device for defective products) 20 is arranged on the downstream side of the convey path in which the image pickup device of the code recognition system 100 is arranged. If the product is determined as a defective product, the rejecter (rejection unit) 20 is operated to extract the defective product out of the system. The information of the extracted defective product (e.g., the information of a new code and a conventional code, label information, detection time, the total number of defective products, and the like) are recorded as management information.

Figure 10:
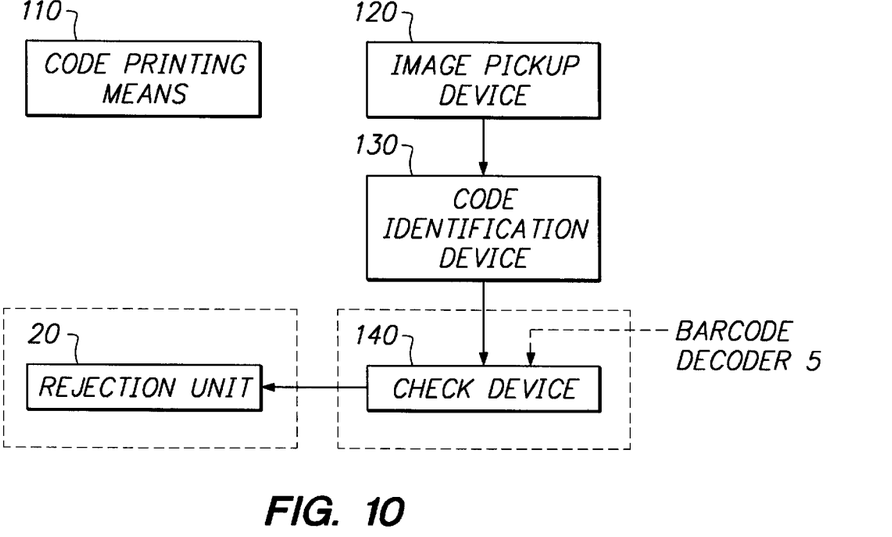
FIG. 10 is a block diagram showing an arrangement of a system according to the present invention.

The arrangement of the code recognition system according to the present invention will be described below. FIG. 10 is a block diagram showing the arrangement of the code recognition system according to the present invention. A portion in a frame indicated by a broken line indicates an optional arrangement. A basic arrangement of the code recognition system comprises a code printing means (print control means for a new code and the printer 10) 110 for printing a new code on the bottom portion of a can to be conveyed, an image pickup device (CCD camera or the like) 120 for picking the image of the bottom portion of the can to be conveyed along a predetermined path, a code identification device (in this embodiment, an image processor consisting of a CPU, a memory, and the like) 130 for receiving a video signal obtained by an image pickup operation of the image pickup device and identifying the new code printed on the can bottom to output an identification code out of the device, and a check device 140 for collating the data of the identification code from the code identification device with data from a barcode scanner (barcode decoder) or the like to check whether the product is defective. In addition, the arrangement also has a network adapting function, so that remote centralized control and remote maintenance can be performed.

In this embodiment, the check device 140 is realized by a sequencer. The sequencer calculates the logical OR between the identification code (decoded data of the product code printed on the can bottom) from the code identification device 130 and the data (decoded data of the product code printed on the label) from the barcode scanner (barcode decoder) 5 to collide with the product code.

When the rejecter 20 is added as the optional arrangement, a defective product detected by the check device 140 can be automatically extracted. In the rejecter 20, when a signal representing a defective product is input from the check device 140, for example, air is instantaneously blown on the side surface portion of the can to push the can to an extraction path, thereby automatically extracting the defective product. In this case, the air must be correctly blown on the central portion of the side surface of the can.

However, when the can is to be extracted a predetermined period of time after the can conveyed to an extraction position, there is a probability that the air cannot be correctly blown on the central portion due to a change in line speed or the like. Therefore, according to this embodiment, in order to avoid an extraction timing from being offset by an error of the line speed, an encoder 21 is used to detect that a defective product reaches the extraction position, thereby controlling the timing of air blow.

In the arrangement as described above, an operation of the code recognition system 100 will be described below with reference to the timing charts in FIGS. 11A and 11B.

Figure 11A:
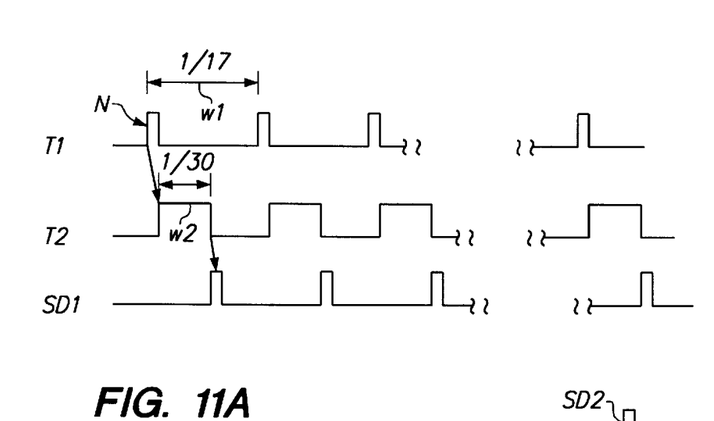
FIGS. 11A and 11B are a timing chart for explaining an operation of the system of the present invention.
Figure 11B:
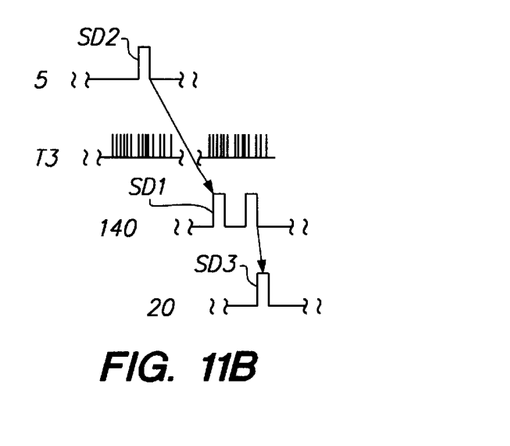

FIG. 11A shows an operation of the code identification device 130 of this system, and is a timing chart showing input T1 of a detection timing of each can, code recognition time T2, and output SD1 of a recognition result. FIG. 11B is a timing chart showing output SD2 of the barcode decoder 5, output T3 of the encoder 21, input/output SD1 of the (sequencer) check device 140, and input SD3 of the rejecter 20.

Cans on which new codes are printed are brought to the center of the convey path by a regulating guide for centering cans and almost continuously conveyed by a convey means such as a conveyor one by one at almost constant convey intervals w1 (e.g., about 1/17 sec). In the code identification device 130, a code recognition process is performed within a period of time (code recognition time w2 is about 1/30 sec in this embodiment) of the convey interval of cans to output the recognition result SD1 out of the device. In this embodiment, when the count values of dots in concentric-circular areas are sequentially detected and decoded, the second figure X2 ($36^1$ figure) and the first figure ($36^0$ figure) X1 of the product code are sequentially decoded in the order, i.e., the second figure ($16^1$ figure) and the first figure ($16^0$ figure) of the ASCII code (X2-A2, X2-A1, X1-A2, and X1-A1) to output the decoded count values.

Here, the process of the code identification device 130 will be described below. In the code identification device 130, a video signal (output signal of each light-receiving element in a line sensor, and, for example, a horizontal scanning signal in a two-dimensional area sensor) obtained by an image pickup operation of the image pickup device 120 is input, the signal level of the component having the wavelength of the input video signal is compared with a reference level in the printing area (each divided area) of the new code. If an amount of change with respect to the reference level exceeds a threshold value, the "presence" of dots is determined. When five continuous dots having predetermined intervals are detected in the concentric-circular area A in FIG. 7, it is determined that the start mark or the end mark is correctly detected.

In this case, for example, the direction of a dot group, a dot interval, and the like are calculated on the basis of X and Y addresses (channel addresses of the sensor) of detected dots, the correctness of the start mark and the correctness of the end mark are examined at once. The addresses of the concentric-circular divided areas are corrected on the basis of the X and Y addresses of the start mark and the end mark. Subsequently, the number of dots in the concentric-circular divided areas B, C, D, and E on which the data code is printed are counted, and the new code is decoded on the basis of the count values to output the decoded code.

As described above, when the numbers of dots in data code areas (B to E) from the outside to the inside of the concentric-circular areas to output the count values, a new code can be rapidly and correctly decoded even in a rotating body in which the printing direction of the new code cannot be specified. When the addresses of the divided areas are corrected by using the start mark and the end mark, even if an error of a width regulating guide on the convey path, an error of the setting position of the image pickup device, or an error caused by a variation in convey speed or vertical vibration of the conveyor is generated, the code can be correctly decoded while the code is automatically corrected.

In the sequencer (check device) 140, the recognition result SD1 from the code identification device 130 and the read result SD2 of a product code from the barcode data 5 are input, and both the product codes collate with each other. If the product codes do not coincide with each other, a can extraction command (reject signal) SD3 (or collation result) is output to the rejecter 20. The above operation is repeated until the production line is stopped, the number of products, the condition data of defective products, and the like are stored in a storage means as information for process analysis or quality improvement.

In the embodiment described above, the data code printed in the printing area has been described above with reference to a case wherein the data code is printed in an almost semicircle of the printing area as shown in FIG. 7. However, the data code may be printed at a position adjacent to the end mark. In this case, there are two signs constituting the data code in one divided area, and a recognizing process must be performed in consideration of the positions of the signs and the output order of count value. For this reason, as in this embodiment, the data code is desirably printed in the almost semicircle of the printing area. In the description of the drawings, concrete numeral values are shown for descriptive convenience. However, as a matter of course, the present invention is not limited to these values. The shape of the bottom surface portion or the upper surface portion of a can on which the printing area of the new code is printed is not limited to a flat surface, and the bottom surface portion or the upper surface portion may have spherical surface (concave curved surface or the like).

As has been described above, according to the present invention, since a code is recognized on the basis of the count values of dots included in the concentric-circular divided areas, the code printed on the bottom surface portion or the upper surface portion of a rotating body such as a can product or bottle product can be rapidly and correctly recognized regardless of the printing direction of the code. For this reason, a desired code is printed on the vessel of a product, and production management can be performed by the recognized code to a production system in which a conventional code cannot be used. Therefore, problems of compliance with the PL (Product Liability) laws can be solved at low cost. The number of dots are calculated in real time regardless of the sizes of dots whose sizes are independently changed, i.e., a change in area =change in number of pixels, and the number of dots is regarded as a binary code. For this reason, a conventional cumbersome registration process of a code pattern is unnecessary.

In addition, when a form wherein an examination area is corrected by using a start mark and an end mark is employed, if an error of a width regulating guide on the convey path, an error of the setting position of the image pickup device, or an error caused by a variation in convey speed or vertical vibration of the conveyor is generated, the code can be correctly decoded while the code is automatically corrected. In addition, when a form wherein a code printed by an ink consisting of a component having a wavelength band out of a visible wavelength band is recognized is employed, if the printing area of the code overlaps the printing area of a conventional code, the code can be recognized. A code which need not be shown to a general consumer or a code which should not be shown to a general consumer can be treated as an object to be recognized. In addition, when a form wherein a product code or the like is examined by collation with a conventional code is employed, the following problem or the like can be avoided. That is, a product contained in a vessel mismatches a product code written on the vessel is shipped.

What is claimed is:

1. A code printing and recognition system for printing, reading, and decoding a code on an article, said article being rotated and conveyed along a predetermined path, said system comprising:

code printing means for printing a code in a printing area of the article, said code comprising a plurality of code signs, said printing area being a portion of a circle having a predetermined radius and centered at a central point of one of a bottom surface portion or a top surface portion of said article; said printing area being divided into a plurality of concentric-circular portions, each of said plurality of code signs being encoded by placing a number of dots in a respective concentric-circular portion;

image pickup means for acquiring an image of at least said printing area of said article; and code recognition means for detecting the dots in each of said plurality of concentric-circular portions, counting said detected dots in each of said plurality of concentric-circular portions, and decoding each of said plurality of code signs on a basis of said dot count in a respective concentric-circular portion.

2. A system according to claim 1, wherein said signs forming said code are printed on a semicircle of the printing area, and said code recognition means uses said dot count values corresponding to each of said plurality of circular portions to reconstruct said code.

3. A system according to claim 1, wherein said dots are detected by said code recognition means by comparing output image signals of analog images of each of said plurality of circular portions with a reference level, said comparison being made in real time while said image pickup means acquires said analog images.

4. A system according to claim 1, wherein said code printing means is designed such that a start mark and an end mark are added to both ends of an outermost circular portion in the circle to print the code, and said code recognition means corrects addresses of said concentric-circular portions on the basis of detected addresses of the start mark and the end mark to perform a recognizing process for the code.

5. A system according to claim 1, wherein said code is printed by said code printing means using an ink consisting of a component having a wavelength band out of a visible wavelength band, and said code recognition means compares the component having the wavelength band of a video signal output from said image pickup means with a reference level to detect the dots.

6. A system according to claim 1, wherein said code printing means is designed such that the code is converted into a code of a predetermined code system, and when the code of the predetermined code system is expressed by an n-ary number (n=an integer), the figures of the n-ary number are printed to correspond to the signs of the code in one-to-one correspondence.

7. A system according to claim 1, where in said rotating article is a container which contains a product, said code includes at least a description of said product, said system further comprising examination means for examining correlation between said product code recognized by said code recognition means and a product label placed at a predetermined position on said container.

8. A system according to claim 7, further comprising a production line for placing said product in said container, said container containing said product being stored in a temporary storage room before being shipped, said printing means being arrayed on a convey path of said container between a location where said product is placed in said container and said temporary storage room, said image pickup means being arranged on a convey path downstream of said printing means.

9. A system according to claim 8, wherein a stop signal is generated to stop said production line when said product code does not correspond to said product label in the examination performed by said examination means.

10. A system according to claim 8, further comprising extraction means for extracting said container out of said production line, said extraction means being arranged on a downstream side of said image pickup means, and wherein said extraction means extracts said container as a defective product when said product code does not correspond to said product label in the examination performed by said examination means.

11. A system according to claim 8, further comprising recording means for recording a result of said examination.

12. A code recognition method for decoding a code printed in a printing area on an article, said article being rotated and conveyed along a predetermined path, said code comprising a plurality of code signs, said printing area being a portion of a circle having a predetermined radius and centered at the central point of the bottom surface portion or the upper surface portion of said article; said printing area being divided into a plurality of concentric-circular portions, each of said plurality of code signs being encoded by placing a number of dots in a respective circular portion, said method comprising:

acquiring an image of at least said printing area of said article;

detecting dots in each of said plurality of concentric-circular portions, counting said detected dots in each of said plurality of concentric-circular portions; and decoding each of said plurality of code signs on a basis of said dot count in a respective concentric-circular portion.

* * * * *